(12) United States Patent
Cheldin

(10) Patent No.: US 7,114,730 B2
(45) Date of Patent: Oct. 3, 2006

(54) GOLF BAG WITH DETACHABLE WHEEL ASSEMBLY

(75) Inventor: Erwin Cheldin, Woodland Hills, CA (US)

(73) Assignee: Erkie, Inc., Woodland Hills, CA (US)

( * ) Notice: Subject to any disclaimer, the term of this patent is extended or adjusted under 35 U.S.C. 154(b) by 464 days.

(21) Appl. No.: 10/445,172

(22) Filed: May 20, 2003

(65) Prior Publication Data

US 2004/0232635 A1 Nov. 25, 2004

(51) Int. Cl.
B62B 1/12 (2006.01)

(52) U.S. Cl. .............................. 280/47.24; 280/47.26; 280/DIG. 6

(58) Field of Classification Search ............. 280/43.15, 280/43.16, 47.131, 47.15, 47.17, 47.24, 47.29, 280/47.26, 47.27, DIG. 6
See application file for complete search history.

(56) References Cited

U.S. PATENT DOCUMENTS

| | | | | |
|---|---|---|---|---|
| 2,556,814 A | * | 6/1951 | Love ........................... | 280/659 |
| 2,868,559 A | * | 1/1959 | Vincelette ................ | 280/47.33 |
| 2,902,287 A | | 9/1959 | Elias | |
| 2,962,294 A | | 11/1960 | Elias | |
| 3,304,036 A | * | 2/1967 | Davis .......................... | 248/514 |
| 3,425,708 A | | 2/1969 | Sato | |
| 3,550,999 A | | 12/1970 | Bogan | |
| 3,953,045 A | | 4/1976 | Feret, Jr. | |
| 4,053,169 A | | 10/1977 | Taylor | |
| 4,062,564 A | * | 12/1977 | Schimmeyer ............... | 280/652 |
| 4,153,264 A | * | 5/1979 | Pfister ......................... | 280/38 |
| 4,245,684 A | | 1/1981 | Street et al. | |
| 4,382,612 A | | 5/1983 | Larkin | |
| 4,522,299 A | | 6/1985 | Clark et al. | |
| 4,576,389 A | * | 3/1986 | Villaveces et al. ....... | 280/43.16 |
| 4,735,425 A | | 4/1988 | Hoff | |
| 4,822,071 A | | 4/1989 | Widegren | |
| 4,832,362 A | | 5/1989 | Chen | |
| 4,911,465 A | | 3/1990 | Hauer | |
| 5,112,068 A | * | 5/1992 | Liao et al. .................... | 280/30 |
| 5,265,892 A | * | 11/1993 | Said ............................ | 280/30 |
| 5,267,750 A | | 12/1993 | Thompson | |
| 5,454,576 A | | 10/1995 | Pitkanen | |
| 5,470,095 A | | 11/1995 | Bridges | |
| 5,484,154 A | * | 1/1996 | Ward .......................... | 280/652 |
| 5,879,022 A | * | 3/1999 | Winton ....................... | 280/655 |
| 6,231,059 B1 | * | 5/2001 | Cheldin .................... | 280/47.24 |
| 6,561,527 B1 | * | 5/2003 | Spadino .................... | 280/47.26 |
| 6,672,600 B1 | * | 1/2004 | Engelhardt et al. ...... | 280/47.26 |

* cited by examiner

*Primary Examiner*—Christopher Bottorff
(74) *Attorney, Agent, or Firm*—Kelly Lowry & Kelley, LLP

(57) ABSTRACT

A golf bag includes a base having a shaft. A pair of wheel assemblies are attachable to, and removable from the shaft. Each wheel assembly includes a wheel and an axle that fits within the shaft such that each wheel is extendable away from, and retractable towards, the base along a common axis. In another embodiment, a golf bag may be motorized.

12 Claims, 5 Drawing Sheets

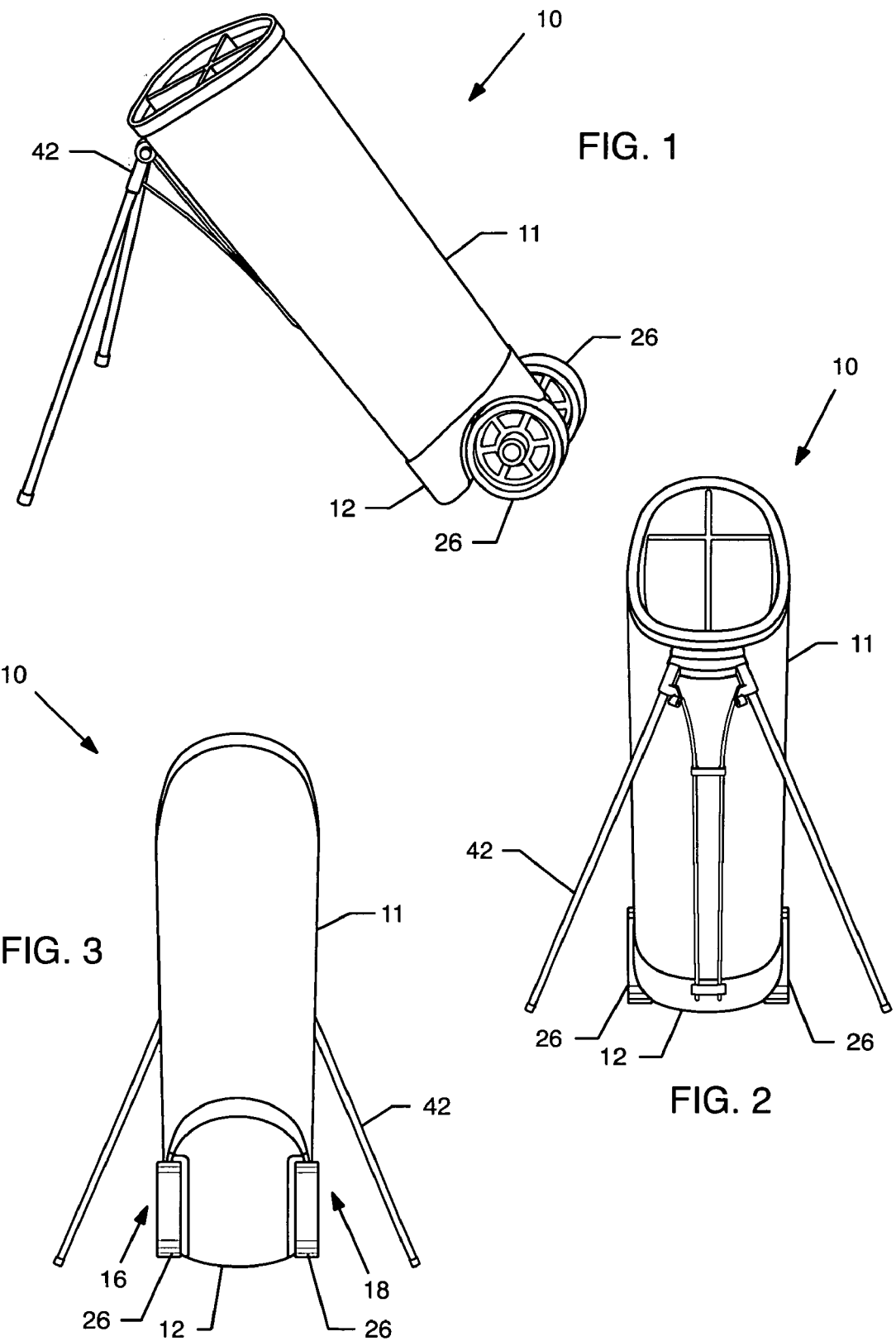

GOLF BAG WITH DETACHABLE WHEEL ASSEMBLY

BACKGROUND OF THE INVENTION

The present invention relates to golf bags and carts. More specifically, the present invention relates to a golf bag having a detachable wheel assembly.

A golf bag is considered standard equipment for any golfer. A golf bag typically includes an elongated, open-top container which accommodates the length of golf clubs, and also various pockets for golf balls, tees, towels, shoes and other golf related items. A golfer can either carry the golf bag over his or her shoulders using straps, tote the golf bag on a riding cart, or place the golf bag on a separate device known as a pull cart.

Many golfers prefer walking to avoid the costs of a riding cart or to obtain a degree of exercise while golfing. Although a golf bag is convenient for its ease of carrying from one location to another, it becomes quite heavy and cumbersome when carried over the length of a golf course. The golf bag can also cause soreness to the golfer's back and shoulder area. As a result, pull carts are frequently used on the golf course in order to obtain the benefits of walking without the need to carry the bag. However, the use of pull carts has its disadvantages.

The golf pull cart is generally constructed of a rigid metal frame with golf bag securing straps, outspread wheels and an upwardly extended handle. Although the cart performs adequately on the golf course, it is often heavy and bulky. Loading the cart and bag when strapped together in a trunk can be very difficult, and both may not fit in the trunks of smaller cars. Oftentimes, the golf bag must be separated from the cart and the cart transported and stored separately. This requires the re-strapping of the bag to the cart when reaching the golf course. Due to the awkwardness of handling typical golf bag pull carts, golfers often leave their own pull carts at home and rent a cart at the golf course when traveling.

Attempts have been made to devise foldable golf carts which aid in transportation; however, these foldable pull carts are also heavy and oftentimes bulky as well. One problem is that the outspread wheels of these carts may make it difficult to place the foldable pull cart into the trunk of a car. Another problem associated with prior foldable pull carts is that they require the loosening and re-tightening of parts in order to unfold the cart for use. Other attempts have been made to combine the pull cart and golf bag into one unit. However, these devices are usually heavy and bulky as they are comprised of the essential components of a pull cart attached to a golf bag. Many of these devices are also complex in their construction and difficult to manipulate and operate.

Another drawback is that the pull carts may be generically designed so that a number of different brands, makes, and styles of golf bags may be used with the same cart. Each type of golf bag may have its own physical characteristics, such as center of gravity, width, length, etc. This may result in a golf bag/pull cart combination that is stable when the cart is used with one type of golf bag, but not stable when the cart is used with another type of bag. The stability of the combination may also be affected by the number of clubs carried in the bag, how many towels or other objects are stored within the bag, etc.

While pull carts such as those described above may provide for a bag/pull cart combination, there is a need for improvement. As mentioned above, while loading the cart and bag when strapped together in a trunk can be very difficult since both may not fit in the trunks of smaller cars, it is desirable to be able to do so.

Accordingly, there is a need for a golf bag that allows the golf bag and pull cart combination to be loaded together into a car trunk. There is also a need for a golf bag that can be adjusted for stability. Therefore, what is needed is a golf bag which can be easily pulled behind a golfer on a golf course and yet is relatively light weight, simple in construction and easy to operate, store and transport. The present invention fulfills these needs and provides other related advantages.

SUMMARY OF THE INVENTION

The present invention, in the form of a golf bag with a detachable wheel assembly, represents an improvement over previous golf bags in that it can function not only as a conventional golf bag, but also as a pull cart. The manufacture of the golf bag of the present invention provides an efficient and cost-effective golf bag/pull cart combination.

An embodiment of the present invention resides in a golf bag comprising, generally, a bag including a base having a shaft extending from one side of the base to an opposite side thereof; and a pair of wheel assemblies attachable to, and removable from, the shaft. Each wheel assembly may include a wheel and an axle, where each axle fits within the shaft and the wheels rotate about a common axis. Each wheel assembly is extendable away from the base and retractable towards the base along the common axis.

The golf bag may additionally include a support stand pivotally attached thereto. The golf bag may also include wheel recesses formed in the base into which the wheels are movable into a retracted position.

At least one lock may be associated with each axle for holding each wheel assembly in an open position. Each wheel assembly may be movable between a retracted position and the open position. Each wheel assembly may be extendable from a first operative position close to the base to a second operative position further from the base that provides greater stability than the first operative position.

The shaft may also include a hollow rod located within and extending beyond the shaft on each side of the base. Each axle may fit within the rod. At least one lock may be located on each axle for holding each wheel assembly in an open position with each wheel assembly being movable between a retracted position and the open position when the locking means is disengaged.

The hollow rod may further include at least one aperture on each side of the base that engages the lock. The shaft and rod may be rectangular.

Another embodiment of the present invention resides in a golf bag comprising, generally, a bag including a base having a shaft extending from one side of the base to an opposite side thereof. A pair of wheels may be attachable to an axle on opposite sides of the axle. The axle may fit within and run along the shaft. A motor may be located on the base with the motor connected to each wheel such that the motor causes each wheel to rotate about the axle when the motor is activated.

The shaft may also include a hollow rod located within and extending beyond the shaft on each side of the base such that the axle fits within the hollow rod. At least one locking means may be located on each wheel for holding each wheel on one end of the axle.

The bag may also include at least one plurality of gears connected between the motor and each wheel that transmit rotational movement from the motor to the wheels. The bag may further include a second plurality of gears such that each plurality of gears is associated with a particular wheel.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is an orthogonal view of one embodiment of a golf bag of the present invention;

FIG. 2 is a rear elevation view of the golf bag of FIG. 1;

FIG. 3 is a front elevation view of the golf bag of FIGS. 1 and 2;

DETAILED DESCRIPTION OF THE PREFERRED EMBODIMENTS

Figure 4:
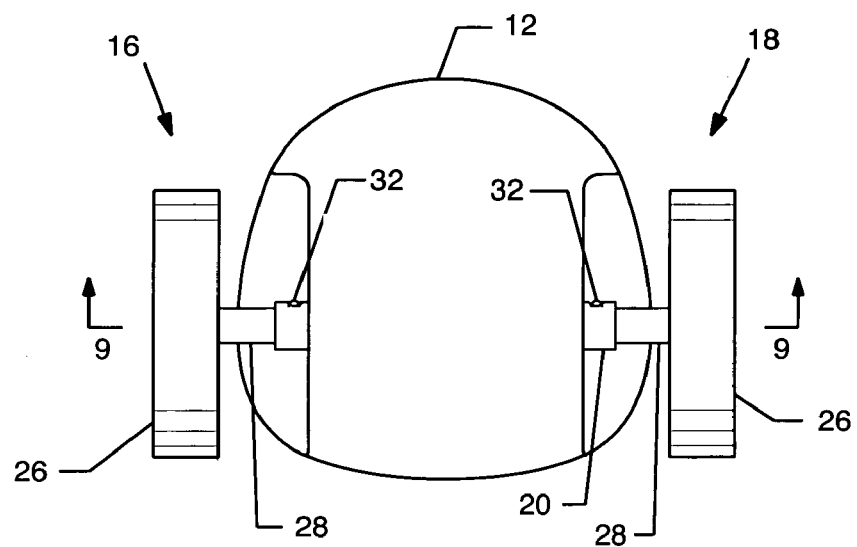
FIG. 4 is a bottom plan view of the golf bag of FIGS. 1 and 2, illustrating each wheel assembly in a locked extended position.
Figure 5:
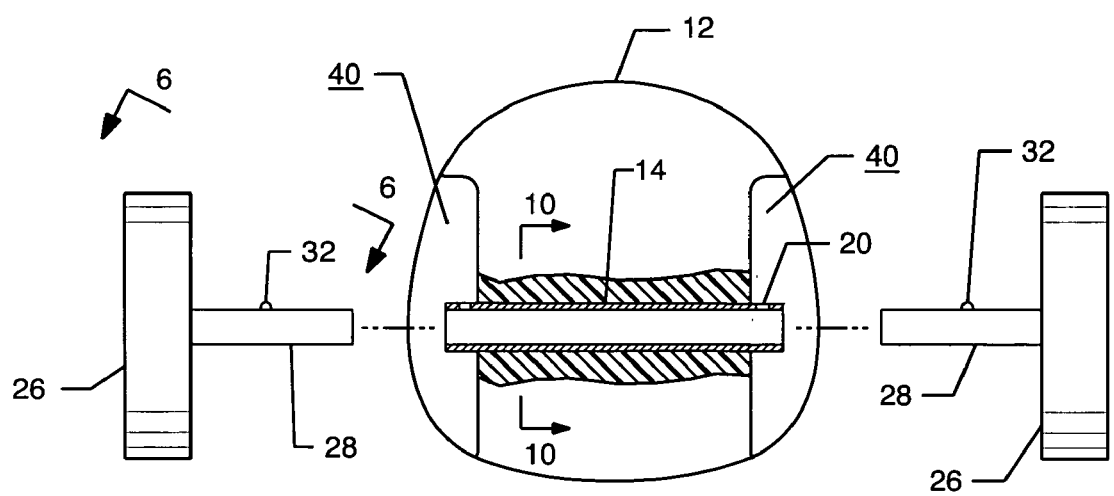
FIG. 5 is a bottom plan view of the golf bag of FIGS. 1 and 2, illustrating the wheel assemblies pulled away from the base.
Figure 6:
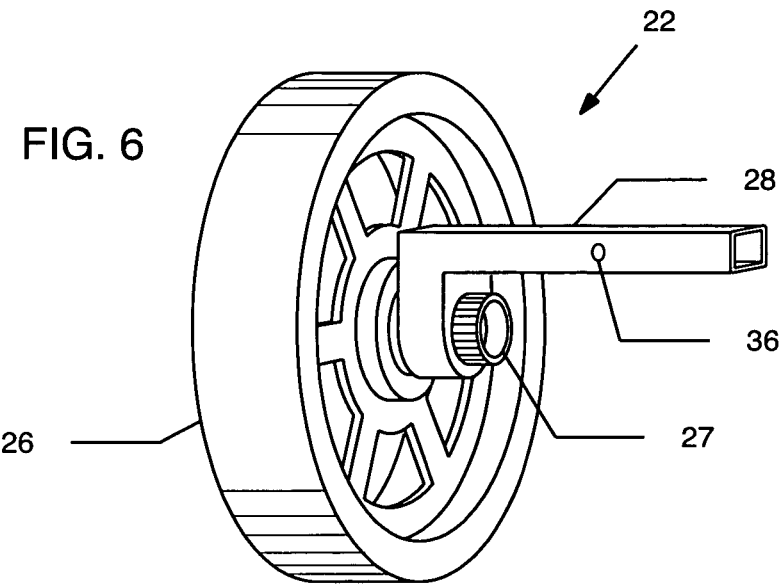
FIG. 6 is an orthogonal view of a wheel assembly.
Figure 7:
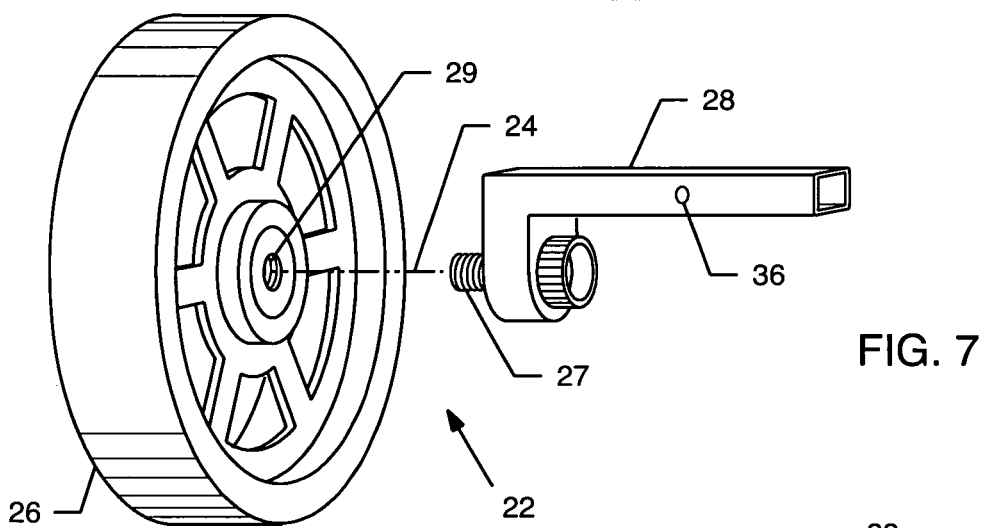
FIG. 7 is an exploded orthogonal view of the wheel assembly of FIG. 6.
Figure 8:
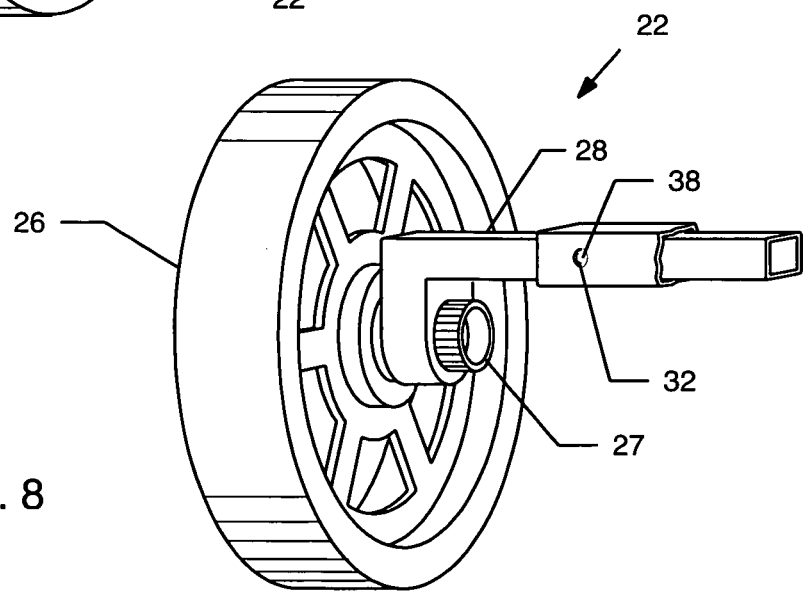
FIG. 8 is an orthogonal cutaway view of a wheel assembly locked into a rod of the base.
Figure 9:
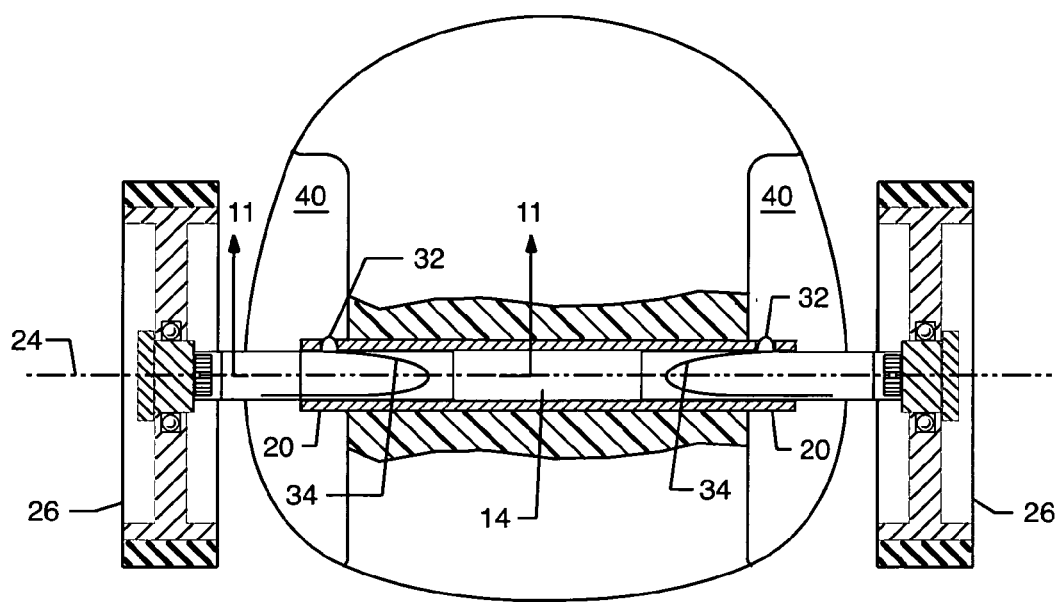
FIG. 9 is a bottom cross-sectional view of the golf bag of FIG. 4.
Figure 10:
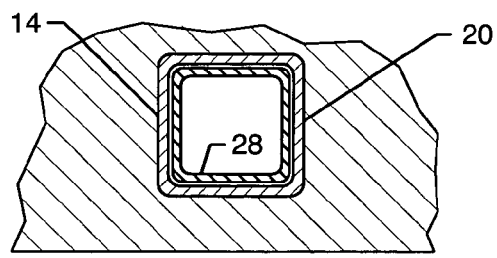
FIG. 10 is a partial side cross-sectional view of the rod and shaft of the base.
Figure 11:
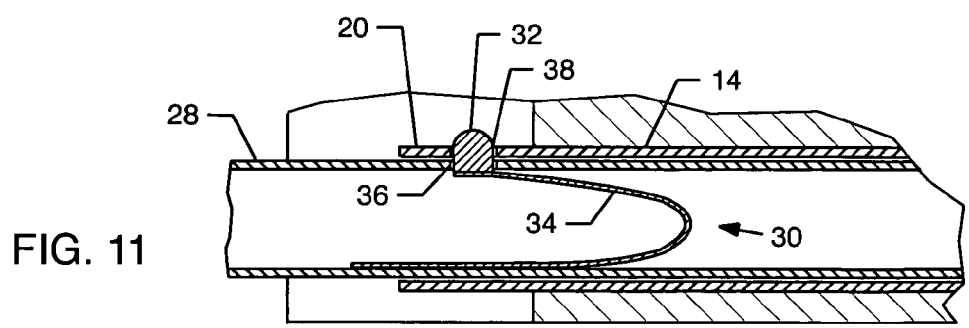
FIG. 11 is a partial front cross-sectional view of a wheel assembly rod locked into the base.

As shown in the drawings for purposes of illustration, the present invention is concerned with a golf bag, generally referred to by the reference number 10 in FIGS. 1–11. The golf bag 10 is comprised of any lightweight durable material such as a plastic shell, nylon fabric, polypropylene or any other suitable material. The golf bag 10 is formed like typical golf bags having a generally cylindrical and hollow body 11 so as to accept golf clubs into an open top. The golf bag 10 may include dividers within the hollow body to separate and protect the shafts of the golf clubs and pockets on the exterior of the golf bag 10 to carry other golf equipment such as shoes, tees and golf balls as is necessary.

In accordance with the present invention, the golf bag 10 includes a base 12 formed at a bottom portion of the golf bag 10, giving the golf bag 10 a defined shape and support. The base 12 has a shaft 14 extending from one side 16 of the base 12 to an opposite side 18. The shaft 14 may be rectangular, circular, triangular or any polygonal shape. The shaft 14 may be located completely within the base 12.

The base 12 may be comprised of any rigid and durable material capable of supporting the weight of a golf bag 10 filled with golf clubs and other golf equipment when the golf bag is at rest or while the golf bag is rigorously being pulled across a golf course. Yet, the base 12 of the golf bag 10 should weigh as little as possible so as not to tire the golfer. Light steel, metal alloys such as an aluminum alloy, and hardened (molded) plastic are preferred.

The base 12 may also include a hollow rod 20 located within and extending beyond the shaft 14 on each side 16, 18 of the base 12. The rod 20 may be rectangular, circular, triangular or any polygonal shape.

A pair of wheel assemblies 22 are attachable to and removable from the shaft 14, and are rotatable about a common axis 24. Each wheel assembly 22 includes a wheel 26 and an axle 28. The wheel 26 and axle 28 are connected to each other by a threaded pin 27. Each wheel 26 has a threaded aperture 29 at its center. The pin 27 is inserted through an aperture (not shown) on the axle 28 and then threadedly mated in wheel aperture 29 in order to form the wheel assembly 22.

The axle 28 fits within the rod 20, and each wheel assembly 22 is extendable away from the base 12 and retractable towards the base along the common axis 24. The axles 28 fit within the rod 20 while the wheels 26 rotate about the common axis 24.

Each wheel assembly 22 may be extendable from a first operative position close to the base 12 to a second operative position further from the base 12. The second operative position provides the golf bag pull cart 10 with greater stability than the first operative position because the greater distance between the two wheels 26, the greater the overall stability of the golf bag 10. The wheel assemblies 22 are extendable along the common axis 24 of the wheels 26 away from the base 12. Likewise, the wheel assemblies 22 are retractable towards the base 12 along the common axis 24. The wheel assemblies 22 are also removable from the base 12 so that the golf bag 10 may more easily fit within a car trunk. As outlined above, the wheel assemblies 22 may be extended or retracted to provide for differing terrain or the individual golfer's specific needs.

As seen in FIGS. 4–11, at least one lock 30 may be located on each axle for holding each wheel assembly 22 in an open position with each wheel assembly 22 being movable between the retracted position and the open position when the lock is disengaged. The locks 30 hold the wheel assemblies 22 in position in order to prevent the golf bag 10 from becoming unstable due to the unexpected extension or retraction of the wheel assemblies while being pulled across the golf course or unexpected extension while in storage.

Each lock 30 includes a cylindrical post 32 connected to a bent flexible member 34 located within the axle 28. The post 32 extends through an aperture 36 located at a fixed point on the axle 28. The rod 20 includes at least two apertures 38 where at least one aperture is located on each end of the rod. The operation of the lock 30 will be more fully described below.

The base 12 also includes wheel recesses 40, which at least partially, if not completely, accept the retracted wheels 26. One wheel recess 40 may be formed on each side 16, 18 of the base 12. The wheels 26 are movably retractable into and fit within the wheel recesses 40. The wheel recesses 40 allow the golfer to fully retract the wheels 26 and store the golf bag pull cart 10 without taking additional vehicle trunk or other transportation or storage space. When the wheels 26 are retracted back towards the base 12, the wheels 26 fit at least partially within the wheel recesses 40 formed in the base 12.

As illustrated in FIGS. 1-3, the golf bag 10 may also incorporate a golf bag stand 42 which is typically pivotally connected to the golf bag 10 so as to extend when placed on the ground and retract back towards the golf bag 10 when the golf bag 10 is either being rolled or carried. The golf bag 10 may also include shoulder straps (not shown) attached to the golf bag 10 on generally the opposite side of the stand 42 to facilitate carrying the golf bag 10 when not being rolled or when the golfer prefers to carry rather than pull the golf bag 10, such as when crossing terrain not suitable for rolling. Preferably, two straps are crossed over one another to give a more even weight distribution across the golfer's shoulders and back which minimizes soreness and injury.

In use, the golf bag 10 may be removed from, for example, the trunk of a vehicle. If necessary, the wheel assemblies 22 may then be attached to the golf bag 10 by slipping the axles 28 of the wheel assemblies 22 into the recess 14 and then manually locked into place when the lock 30 engages. Once the wheel assemblies 22 are locked into place, the golf bag 10 may be pulled behind the golfer. If the wheel assemblies 22 are separate from the base 12, a user can integrate them with the base 12 by depressing the post 32 extending through the aperture 36 on the axle 28. The user then inserts the axle 28 into the rod 20. Once the post 32 enters the rod 20, the interior surface of the rod 20 maintains the post 32 in a depressed position. However, once the post 32 becomes coaxial with one of the apertures 38 of the rod 20, the force of the flexible member 34 pushes the post 32 through the aperture 38, locking the wheel assembly 22 in position. If the user desires to move the wheel 26 into a wheel recess 40, the user can depress the post 32, disengaging the lock 30, and push the wheel 26 towards the wheel recess 40 until it can go no further. The present invention is particularly useful as the golfer has the option of pulling or carrying one piece of equipment which is lightweight, compact and does not require the assembly and disassembly of complicated mechanisms.

Alternatively, if the golf bag 10 includes a strap, the golfer can sling the golf bag 10 over his or her shoulder for carrying. In another alternative, the golf bag 10 may also have a grip attached on the golf bag 10 to facilitate moving the golf bag 10 a short distance using only one hand.

Figure 12:
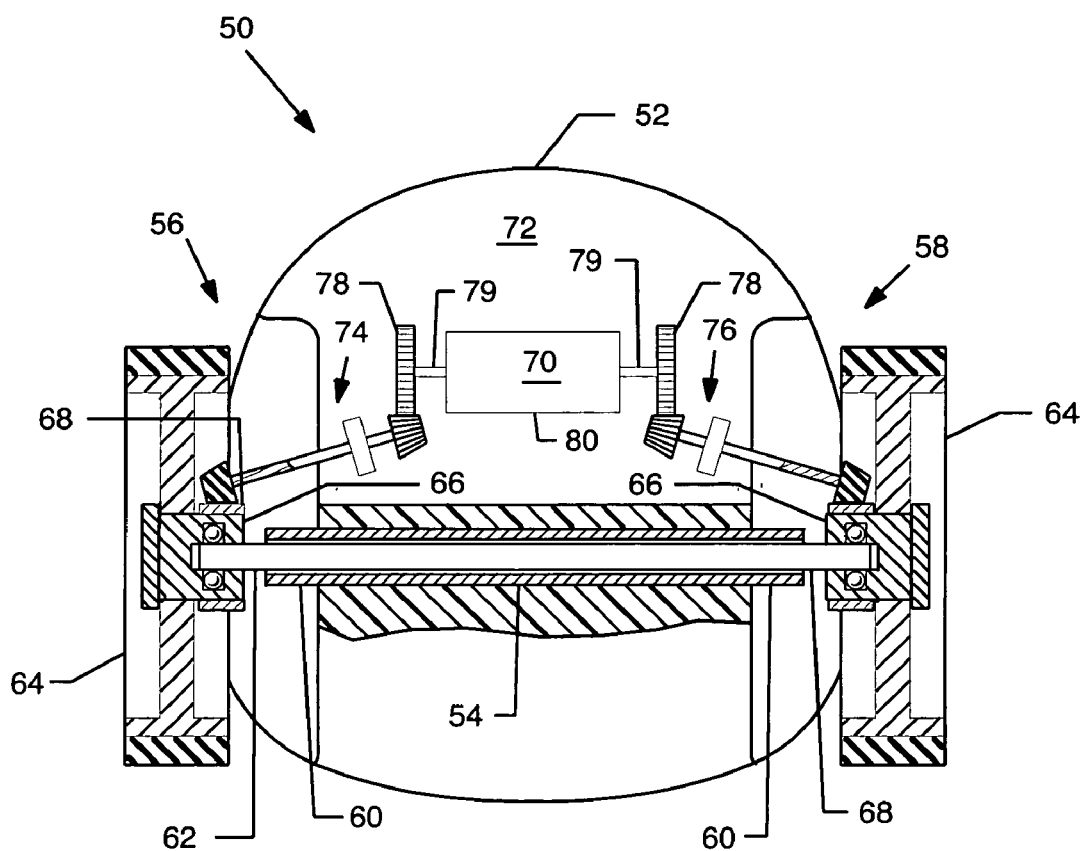
FIG. 12 is a bottom partially cross-sectional view of another embodiment of a golf bag of the present invention.

In accordance with the present invention, as seen in FIG. 12, a motorized golf bag 50 includes a base 52 formed at a bottom portion of the golf bag 50, giving the golf bag 10 a defined shape and support. The base 52 has a shaft 54 extending from one side 56 of the base 52 to an opposite side 58. The shaft 54 may be rectangular, circular, triangular or any polygonal shape. The shaft 54 may be located completely within the base 52.

The base 52 may be comprised of any rigid and durable material capable of supporting the weight of a golf bag 50 filled with golf clubs and other golf equipment when the golf bag is at rest or while the golf bag is rigorously being pulled across a golf course. Yet, the base 52 of the golf bag 50 should weigh as little as possible so as not to tire the golfer. Light steel, metal alloys such as an aluminum alloy, and hardened (molded) plastic are preferred.

The base 52 may also include a hollow rod 60 located within and extending beyond the shaft 54 on each side 56, 58 of the base 52. The exterior of the rod 20 may be rectangular, circular, triangular or any polygonal shape as long as it correlates with the shape of the shaft 54.

A circular axle 62 extends through the rod 60. The interior of the rod 60 is circular so as to receive the circular axle 62. A wheel 64 is located on each end of the axle 62 and each wheel 64 may be attachable to and removable from the axle 62. The wheels 64 and axle 62 are connected to each other at a hub 66 with bearings located at the center of each wheel 64. Each end of the axle 62 fits within the hub 66 of a particular wheel 64.

The base 52 may further include a motor assembly 70 which may be located on the bottom surface 72 of the base with the motor assembly 70 connected to each wheel 64 such that the motor assembly 70 causes each wheel 64 to rotate about the axle 62 when the motor assembly 70 is activated. The bag 50 may also include a two sets of gears 74, 76 where each set of gears 74, 76 is connected between the motor 70 and a particular wheel 64. The gears 74, 76 transmit rotational movement from the motor 70 to the wheels 64. The motor assembly 70 includes a gear 78 located on a drive shaft 79 protruding from each side of the motor assembly 70. Each of these gears 78 matingly engages a particular set of gears 74, 76 on one end. The other end of the particular set of gears 74, 76 engages an exterior surface portion 68 located on the hub 66 of a particular wheel 64 such that the rotation of the gear 74, 76 is mechanically transferred to the wheel 64, causing the wheel 64 to rotate.

The motor assembly 70 further includes a motor (not shown) and a battery (not shown) integrated into a housing 80. The battery may be non-rechargeable or rechargeable. The motor may be activated by a control switch or handle (not shown) located on the golf bag 50. The motor may turn the wheels in either direction so that the user can move the golf bag 50 both forwards and backwards. The user is able to hold the golf bag 50 in such a way so as to control the direction the golf bag 50 is moving. As a safety feature to prevent runaway golf bags, the golf bag 50 may further include a dead man switch (not shown) that automatically deactivates the motor when the user is not depressing the dead man switch.

In the alternative, the motor assembly 70 may be integrated into the base 52 itself. In an additional alternative, when the motor assembly 70 is integrated into the base itself, the drive shaft 79 of the motor assembly 70 may be connected directly to the axle 62.

In another alternative, instead of the shafts 14, 54 described above, the base of the golf bag may instead include a cylindrical recess extending from one side of the base to the opposite side. The cylindrical recess may be partially open to the bottom surface of the base. If the recess is partially open to the base, the recess is typically either C-shaped to have a semi-circular cross-section, or a greater than semi-circular cross-section. A portion of an axle of a wheel assemblies, such as the one described above, may be placed within the recess. A plurality of latches may be attached to the bottom surface of the base. Each latch may be pivotally movable between a closed position holding at least one of the wheel assemblies within the cylindrical recess, and an open position allowing the wheel assembly to be removed from the base or extendable along a common axis. The latches are swing-lock latches that snap in place on each side to hold or remove the wheel assemblies. If the recess is semi-circular in cross-section, then the wheel assemblies are rest-seated within the recess and latches help hold the wheel assemblies in position within the recess. If the recess is greater than semi-circular in cross-section, then the wheel assemblies are held within the recess by the shape of the recess itself although the latches still help hold the wheel assemblies in position within the recess.

The above-described embodiments of the present invention are illustrative only and not limiting. It will thus be apparent to those skilled in the art that various changes and modifications may be made without departing from this invention in its broader aspects. Therefore, the appended claims encompass all such changes and modifications as falling within the true spirit and scope of this invention.

What is claimed is:

1. A combined golf bag and pull cart that provides for both compact, easy storage and greater stability on a golf course, comprising:

a golf bag having a base formed at a base portion of the golf bag;
a shaft having two ends extending through the base;
a hollow rod within the shaft and extending beyond each end of the shaft;
a pair of wheel assemblies, one wheel assembly removably attached to the hollow rod at each end of the shaft, each wheel assembly including a wheel and an axle, wherein the wheels rotate about a common axis parallel to and offset from the shaft;
each wheel assembly independently extendable from a first operative position close to the base to a second operative position further from the base;
wherein the first operative position provides for compact, easy storage;
the second operative position provides greater stability on a golf course; and the first and second operative positions are disposed along the common axis.

2. The combined golf bag and pull cart of claim 1, including a support stand pivotally attached thereto.

3. The combined golf bag and pull cart of claim 1, including wheel recesses formed in the base into which the wheels are movable when in the first operative position.

4. The combined golf bag and pull cart of claim 1, including at least one lock associated with each axle for holding each wheel assembly in either the first operative position or the second operative position.

5. The combined golf bag and pull cart of claim 4, wherein the hollow rod further includes at least one aperture on each side of the base that engages one of the locks.

6. The combined golf bag and pull cart of claim 1, wherein the shaft and rod are rectangular.

7. A combined golf bag and pull cart that provides for both compact, easy storage and greater stability on a golf course, comprising:
a golf bag having a base formed at a base portion of the golf bag;
a shaft having two ends extending through the base;
a hollow rod within the shaft and extending beyond each end of the shaft;
a pair of wheel assemblies, one wheel assembly removably attached to the hollow rod at each end of the shaft, each wheel assembly including a wheel and an axle, wherein the wheels rotate about a common axis parallel to and offset from the shaft;
each wheel assembly independently extendable from a first operative position close to the base to a second operative position further from the base;
at least one lock associated with each axle for holding each wheel assembly in either the first operative position or the second operative position, wherein the hollow rod further includes at least one aperture on each side of the base that engages one of the locks;
wherein the first operative position provides for compact, easy storage; and
wherein the second operative position provides greater stability on a golf course.

8. The combined golf bag and pull cart of claim 7, including a support stand pivotally attached thereto.

9. The combined golf bag and pull cart of claim 7, including wheel recesses formed in the base into which the wheels are movable when in the first operative position.

10. The combined golf bag and pull cart of claim 7, wherein the shaft and rod are rectangular.

11. A combined golf bag and pull cart that provides for both compact, easy storage and greater stability on a golf course, comprising:
a golf bag having a base formed at a base portion of the golf bag;
a rectangular shaft having two ends extending through the base;
a rectangular hollow rod within the shaft and extending beyond each end of the shaft;
a pair of wheel assemblies, one wheel assembly removably attached to the hollow rod at each end of the shaft, each wheel assembly including a wheel and an axle, wherein the wheels rotate about a common axis parallel to and offset from the shaft;
each wheel assembly independently extendable from a first operative position close to the base to a second operative position further from the base;
wheel recesses formed in the base into which the wheels are movable when in the first operative position;
at least one lock associated with each axle for holding each wheel assembly in either the first operative position or the second operative position, wherein the hollow rod further includes at least one aperture on each side of the base that engages one of the locks;
wherein the first operative position provides for compact, easy storage; and
wherein the second operative position provides greater stability on a golf course.

12. The combined golf bag and pull cart of claim 11, including a support stand pivotally attached thereto.

* * * * *